United States Patent Office

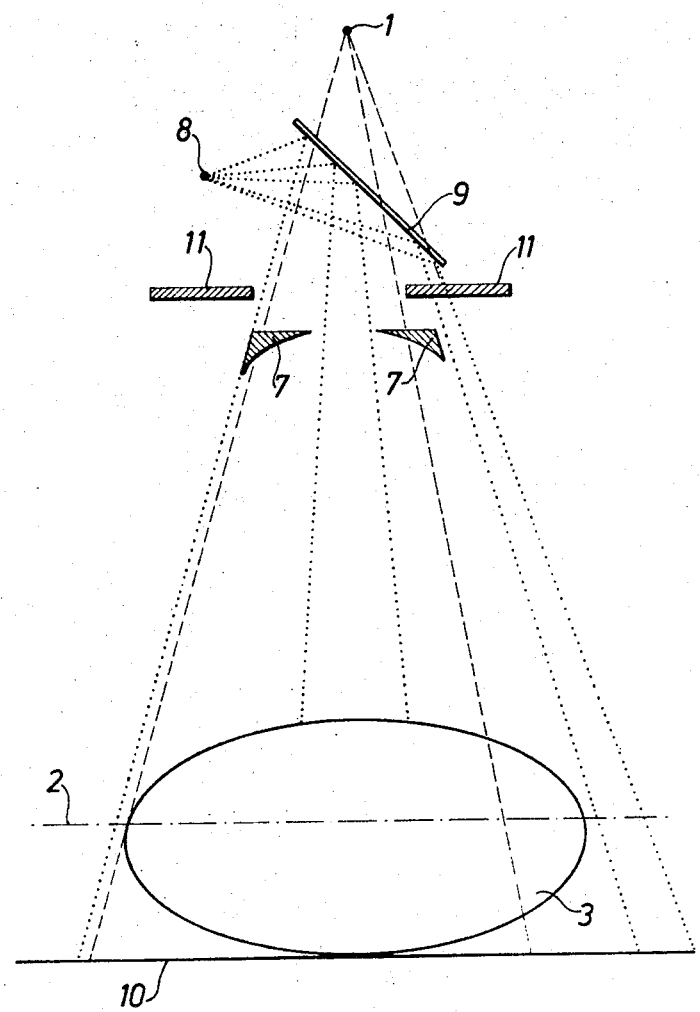

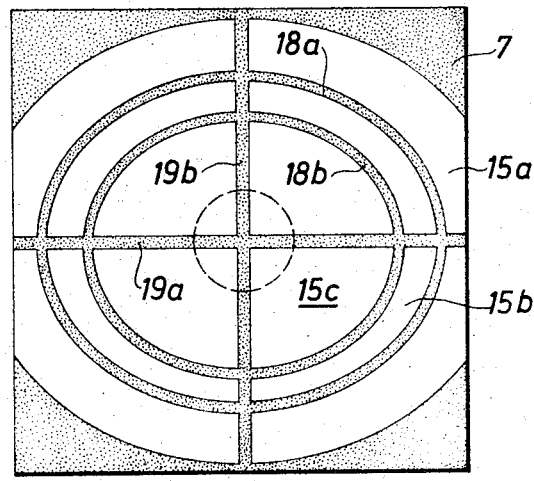
Fig. 5a
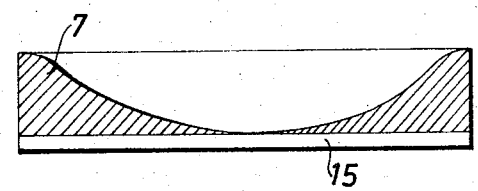
Fig. 5b
Fig. 6a
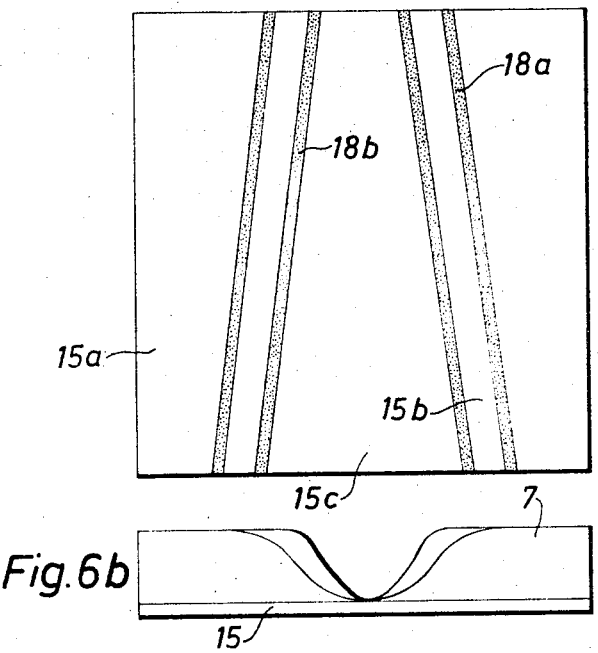
Fig. 6b

3,717,768
Patented Feb. 20, 1973

3,717,768
X-RAY FILTER DEVICE IN COMBINATION WITH A POSITIONING LIGHT CONVERGING MEANS
Paul Ragnvald Edholm, Linkoping, and Nils Bertil Jacobson, Solna, Sweden, assignors to Medinova AB, Solna, Sweden
Filed Feb. 2, 1971, Ser. No. 111,828
Claims priority, application Sweden, Feb. 9, 1970, 1,651/70; Aug. 20, 1970, 11,356/70
Int. Cl. H01j 5/16
U.S. Cl. 250—86
12 Claims

ABSTRACT OF THE DISCLOSURE

The invention relates to a radiographic apparatus provided with an absorption filter device inserted in the radiation path between the radiation source and the object to be radiographed for compensating the variations in thickness, density and absorption properties in different parts of the object to be radiographed so as to produce a more uniform average exposure of the film and thereby a more uniform image contrast in all parts of the radiograph of the object. The absorption filter device includes one or several bodies of a radiation absorbing material, which are shaped to give varying absorption of the radiation in different parts of the radiation beam and which are displaceable relative the radiation beam so that their positions can be adjusted with regard to the size and shape of the actual object to be radiographed. For facilitating the adjustment of the absorption body or bodies of the filter device to correct positions relative to the radiation beam the radiographic apparatus is provided with an optical system for directing a beam of visible light towards the absorption body or bodies, respectively, in such a manner that the visible light beam after having been affected by the absorption body leaves this body in the same direction towards the object as if it originated from the source of ionizing and penetrative radiation, whereby the visible light beam produces a visible image representation of the absorption body upon the object to be radiographed and its support surface, respectively.

---

The present invention relates to radiographic apparatuses and more particularly to a device in radiographic apparatuses for equalizing the average exposure in the image plane of the apparatus so that the average exposure is made substantially constant all over the surface of the image recording medium being used.

A radiographic apparatus comprises, as well known in the art, as its fundamental components a source of an ionizing and penetrative radiation, normally an X-ray tube, an object plane in which the object to be radiographed is positioned, and an image plane on the opposite side of the object plane relative to the radiation source, in which image plane an image recording medium or device is disposed. The image recording medium may be a film sensitive to the ionizing radiation, a fluorescent display screen or an electronic image amplifier. An important problem in radiography apparatuses resides therein that the average intensity in different portions of the radiation beam leaving the object being radiographed and thus the average exposure of the corresponding different portions of the image recording medium may display very large differences caused by differences in thickness, density and absorption properties in different portions of the object. Due to this it is often impossible to obtain an exposure within the prescribed range of the image recording medium, the so-called exposure latitude, over the entire area of the image recording medium. Thus, certain portions or areas of the radiograph may be overexposed, whereas other areas may be underexposed, wherefore in these areas the image contrast becomes too small to give the desired and necessary information on the corresponding portions of the object being radiographed.

In order to overcome this problem it has been suggested in the art to modify the radiation by means of absorption filter means disposed in the radiation path between the radiation source and the object plane in such a manner that the average intensity of the radiation in different portions of the image plane and thus the average exposure of different areas of the image recording medium is equalized and made substantially constant over the entire image plane. Such an absorption filter means consist of one or several bodies of a radiation absorbing material, generally a metal, and these absorption bodies have such a shape, thickness in the direction of radiation and location in the radiation beam that their absorption of different portions of the radiation beam is substantially inversely proportional to the absorption of the corresponding portions of the radiation beam in the object being radiographed. It is appreciated that the position of these absorption bodies relative to the radiation beam must be adjusted very accurately if the bodies are to influence the radiation in a correct manner with regard to the size and the shape of the object to be radiographed. The adjustment of the absorption bodies to correct positions relative to the radiation beam has also involved appreciable difficulties in the prior art.

The object of the present invention is therefore to provide an improved radiographic apparatus of the type mentioned in the foregoing, in which the correct positioning of the absorption bodies relative to the ionizing radiation beam with regard to the size and the shape of the object to be radiographed is substantially facilitated.

Therefore the radiographic apparatus according to the invention comprises a source of visible light for emitting a beam of visible light towards the absorption filter device in such a manner that the light beam after having been affected by the absorption body or bodies in the filter device leaves the bodies in a direction towards the object plane such as if the light beam originated from the source of ionizing radiation, whereby a visible reproduction of the position of the absorption body or bodies in the radiation path is produced in the object plane by the light beam. Consequently, according to the invention a visible "image" of the absorption body or bodies is projected by means of visible light beam upon the object plane and the object is disposed in this plane in such a manner that such "image" corresponds, as to its position, to the "shadow" that the absorption body or bodies will give upon the object when this is exposed to the ionizing and penetrative radiation beam from the radiation source of the radiographic apparatus through the absorption bodies of the filter device.

According to one embodiment of the invention the visible light beam is directed towards the side of the absorption filter device facing the ionizing radiation source so that the absorption body or bodies are illuminated by the visible light beam in the same way as they are "illuminated" by the ionizing radiation beam, whereby a visible shadow image of the absorption body or bodies, respectively, is produced on the object plane and the object to be radiographed. This shadow image can be used for guidance when adjusting the absorption body or bodies, respectively, into correct positions.

According to another embodiment of the invention the visible light beam is directed towards the side of the absorption filter device facing the object plane and the absorption body of the filter device is provided with at least one light reflecting surface facing the object plane and adapted to reflect the visible light beam towards the object plane in the direction it would have if it originated from the source of ionizing radiation. Also in this case a visible "image" of the absorption body is produced upon the object plane and the object to be radiographed, which image can be used for guidance when adjusting the position of the absorption body.

In the following the invention and additional characteristic features thereof will be described more in detail with reference to the accompanying drawing, which shows by way of example several embodiments of the invention.

In the drawing:

FIG. 2 illustrates schematically a first embodiment of a device according to the invention for facilitating the adjustment of the absorption bodies into correct positions, in which device the visible light beam is directed towards the side of the absorption bodies facing the ionizing radiation source;

Figure 4:
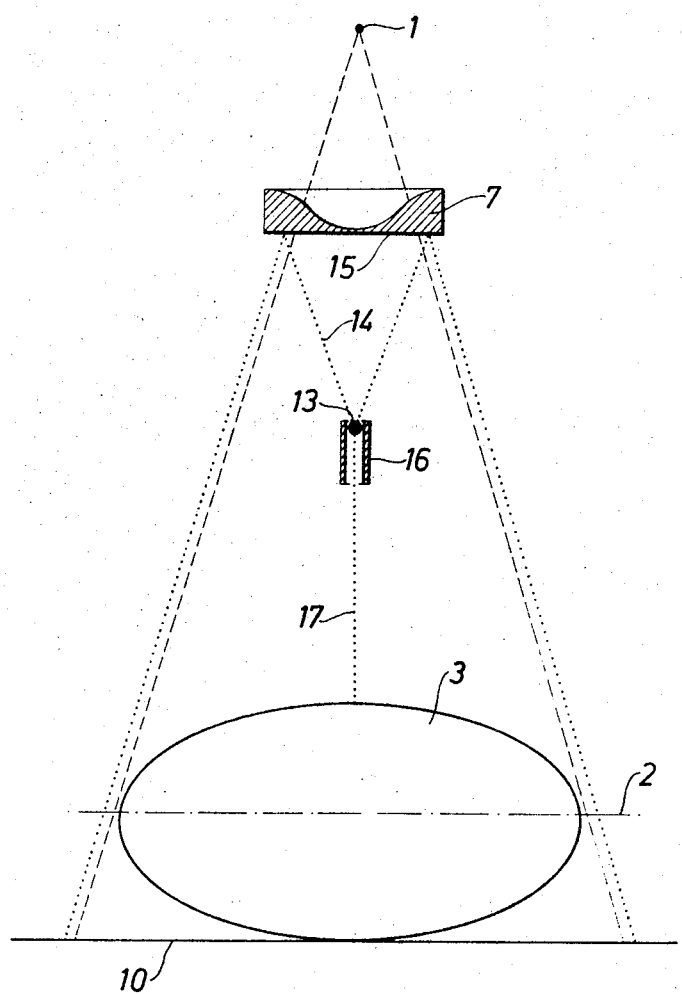
Figure 7:
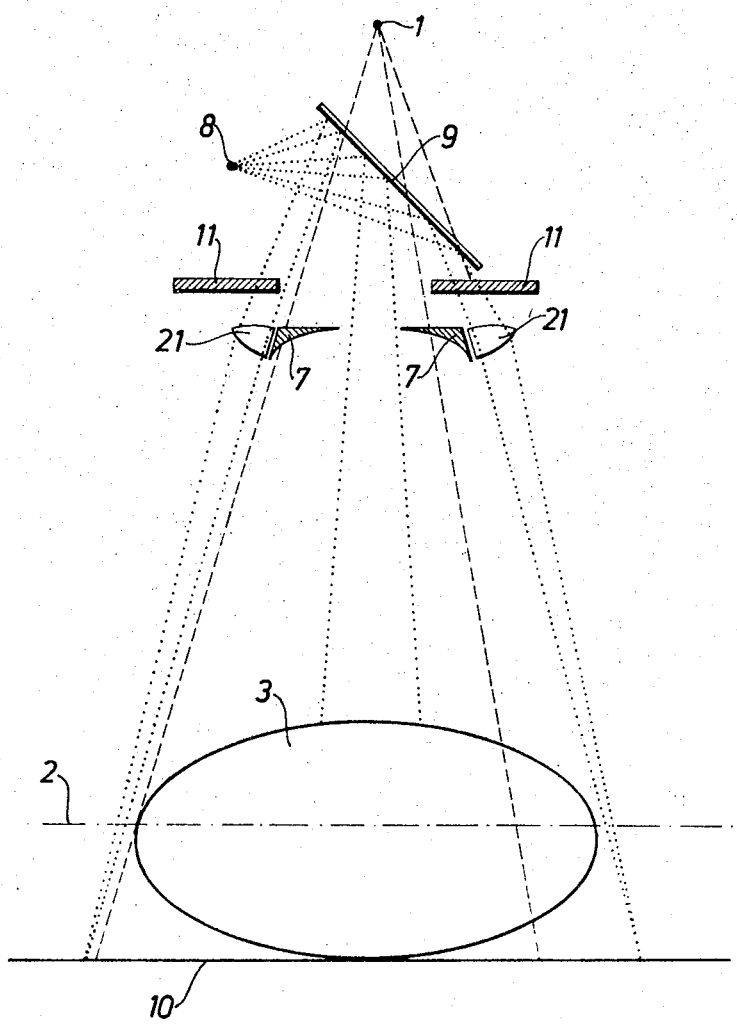
Figure 8:
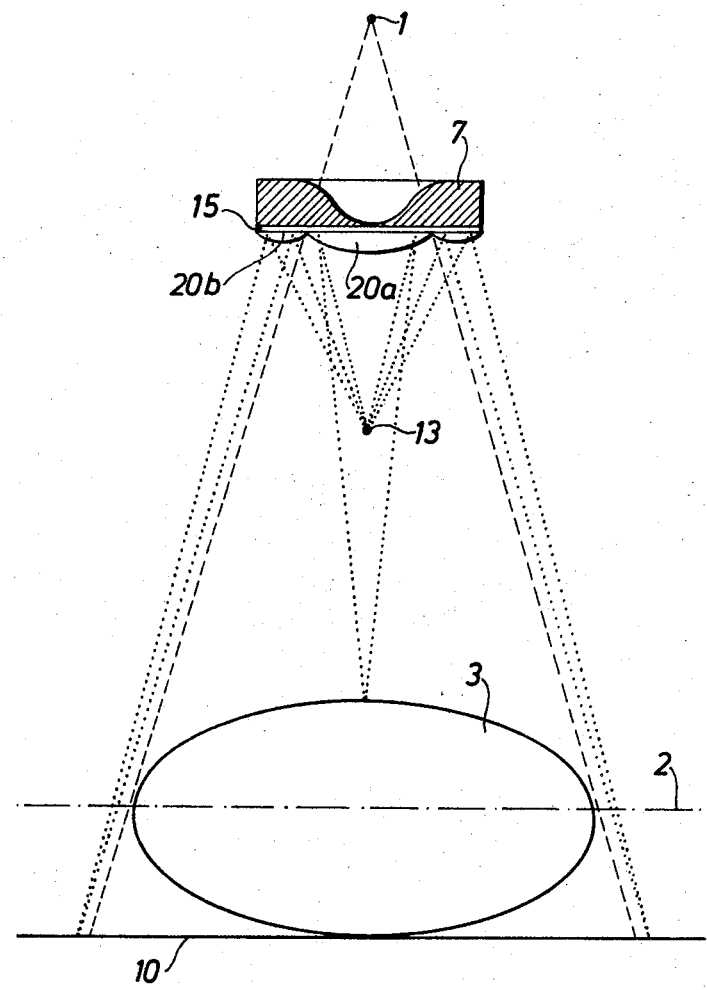
Figure 9:
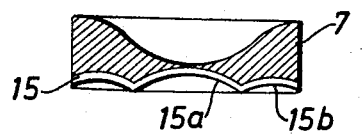

FIG. 4 shows schematically a second embodiment of a device according to the invention for facilitating the adjustment of the absorption bodies into correct positions, in which device the visible light beam is directed towards the side of the absorption body facing the object plane and the absorption body is provided with a light reflecting surface reflecting the visible light beam towards the object plane;

FIGS. 5a and 5b show in elevation and section, respectively, a simple embodiment of an absorption body that can be used in a device acocrding to FIG. 4;

FIGS. 6a and 6b are a top view and an end view, respectively, of a second simple embodiment of an absorption body usable in a device according to FIG. 4;

FIG. 7 shows schematically still another embodiment of a device according to the invention, in which the visible light beam is directed towards the side of the absorption bodies facing the ionizing radiation source and the absorption bodies are provided with optical lenses for focusing predetermined portions of the light beam to produce light intense areas in the object plane;

FIG. 8 shows schematically still another embodiment of a device according to the invention, in which the visible light beam is directed towards the side of the absorption body facing the object plane and this side of the absorption body is provided with a light reflecting surface and additionally with optical lenses for focusing predetermined portions of the light beam to produce light intense areas in the object plane; and FIG. 9 shows still another embodiment of a device according to the invention, in which the visible light beam is directed towards the side of the absorption body facing the object plane and this side of the absorption body is provided with a light reflecting surface having concave portions for focusing predetermined portions of the light beam to produce light intense areas in the object plane.

Figure 1:
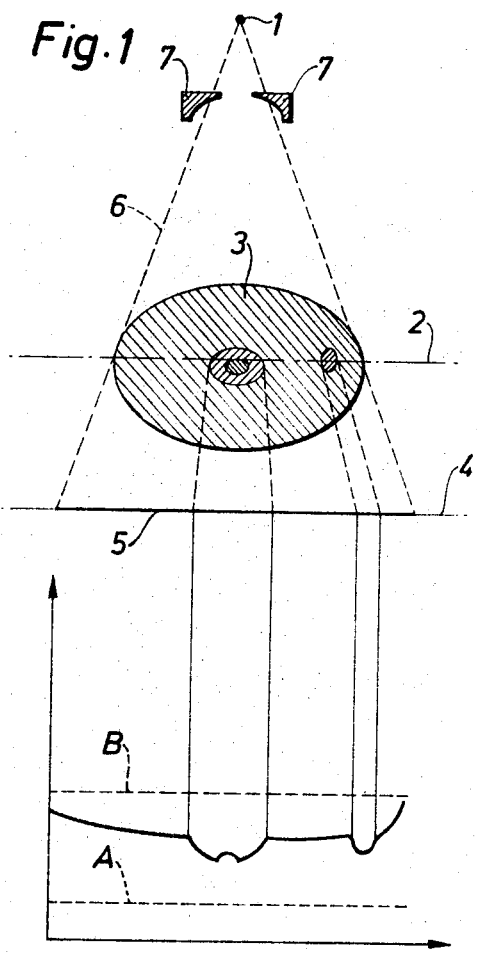
FIG. 1 illustrates schematically the method according to the invention for equalizing the average exposure in a radiographic apparatus by means of radiation absorbing bodies disposed in the radiation path between the radiation source and the object plane.

FIG. 1 in the drawing shows only very schematically the fundamental lay-out of a radiographic apparatus comprising a source 1 of ionizing and penetrating radiation, generally consisting of an X-ray tube, an object plane 2 containing the object 3 to be radiographed and an image plane 4 containing the image recording medium 5 to be used, which in the illustrated example consists of a film sensitive to the ionizing radiation. The radiation beam emitted from the radiation source and used for producing a radiograph of the object 3 is schematically indicated by means of dotted lines 6. As schematically illustrated it is assumed that the object 3 displays large variations in thickness, density and absorption properties. Therefore, the radiation beam leaving the object 3 would normally display very substantial variations in average intensity in different portions of the image plane 4. These variations would cause appreciable variations in the average exposure of the corresponding different portions of the film 5, whereby some areas would be overexposed and other areas might be underexposed. In order to prevent such a possibility an absorption filter device is disposed in the radiation path of the ionizing radiation beam 6 between the radiation source 1 and the object plane 2, preferably close to the radiation source 1. This absorption filter device consists substantially of one or several bodies 7 of a radiation absorbing material, having a varying thickness in the direction of radiation, and thus a varying absorption, and such shape and location relative the radiation beam 6 that their absorption of different portions of the radiation beam 6 is generally inversely proportional to the absorption of the corresponding portions of the radiation beam in the obeject 3. In this way an equalization of the intensity variations in the radiation beam leaving the object 3 and exposing the film 6 is obtained, whereby an intensity distribution in the image plane 4 as illustrated by the diagram at the bottom of FIG. 1 may be obtained. In this diagram the horizontal axis represents the location in the image plane 4, whereas the vertical axis represents the radiation intensity and consequently the exposure of the film 5. The range between the two indicated intensity levels A and B is assumed to be the prescribed working range of the film 5, the so called exposure latitude. As can be seen from the diagram, the intensity in all parts of the radiation beam falls within this intensity range. For intensities above the level B contrasts in the image cannot be seen, as the film 5 is overexposed. The intensity range below the level A consists of a background fogging, in which weak contrasts in the image become lost. The magnitude of this intensity range is determined substantially by the magnitude of the secondary or scattered radiation. Due to the absorption bodies 7 introduced into the radiation path between the radiation source 1 and the object 3 and preferably close to the radiation source 1 the scattered radiation is comparatively small in the image plane 4, as the scattered radiation from the absorption bodies 7 does not reach the image plane 4 and the scattered radiation from the object 3 is reduced due to the fact that the intensity of the radiation beam 6 is reduced by the absorption bodies 7 before the radiation beam reaches the object 3.

It is obvious that in order to achieve the intended result it must be possible to adjust the position of the absorption bodies 7 very accurately relative to the radiation beam 6 with regard to the shape and size of the actual object 3 to be radiographed. For this adjustment the absorption bodies 7 are preferably mounted so as to be displaceable in a plane substantially perpendicular to the direction of radiation or along a spherical surface having the radiation source 1 as its center. If only a single absorption body is used, this may preferably also be rotatable about an axis parallel to the central ray in the radiation beam from the radiation source 1. The absorption bodies may also be displaceable in the direction of radiation so that their distance from the radiation source 1 can be varied.

For facilitating the adjustment of the absorption bodies into correct positions with regard to the size and shape of the object to be radiographed the device according to the invention illustrated by way of example in FIG. 2 comprises a source 8 of visible light emitting a visible light beam (indicated by dotted lines), which is directed via an oblique mirror 9 disposed between the ionizing radiation source 1 and the absorption bodies 7 towards the absorption bodies 7 in the same direction as the ionizing radiation beam (indicated by dashed lines) from the radiation source 1. Consequently, the visible light beam is directed towards the absorption bodies 7 as if it originated from the radiation source 1. It is appreciated that the visible light beam produces a shadow image of the absorption bodies 7 on the object 3 in the object plane 2 and the support surface 10 for the object. This shadow image can be used as a guide when adjusting the absorption bodies 7 into correct positions with regard to the size and shape of the object 3. The light source 8 and the oblique mirror 9 correspond in principle to the optical field indicator generally used in radiographic apparatuses and may in practice consist of this field indicator.

The radiographic apparatus illustrated by way of example in FIG. 2 is also in the conventional manner provided with a diaphragm 11 for restricting the ionizing radiation beam from the radiation source 1. Furthermore, diaphragm 11 can be adjusted into its correct position with the shadow image of the diaphragm produced by the visible light beam from the light source 1 on the object 3 and its support surface 10 used as a guide. In order to make it possible to adjust the position of the diaphragm 11 and the position of the absorption bodies 7 independently it should preferably be possible to distinguish the shadow image of the diaphragm 11 from the shadow image of the absorption bodies 7. This can be achieved in that the diaphragm 11 and the absorption bodies 7 are made of materials having different transmission properties for the visible light. The diaphragm 11 can for instance preferably consist of lead glass which is transparent to visible light but absorbs the ionizing radiation, whereas the absorption bodies 7 are made from a material which is not penetrated by the visible light. If the lead glass is stained or provided with an optical screen pattern, the shadow of the diaphragm 11 upon the object 3 and its support surface 10 will be easily recognizable. First the diaphragm 11 is adjusted to its desired position with the aid of its shadow so that the desired restriction of the ionizing radiation beam is obtained, whereafter the absorption bodies 7 are moved into the radiation paths to their desired positions therein, the shadow of the absorption bodies being used for guidance during this operation.

Figure 3:
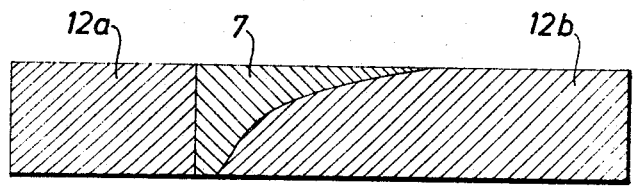
FIG. 3 shows in cross-section an embodiment of an absorption body that may be used in a device according to FIG 2.

Also the absorption bodies 7 may consist of a material having a high transmission factor for the visible light but a predetermined limited transmission factor for the ionizing radiation. Thus for instance the absorption bodies may be made of a plastics or a similar material containing a powdery substance with a high atomic number so that suitable absorption properties for the ionizing radiation are obtained. The absorption bodies can also be made of lead glass. If the transparent absorption bodies have a different colour or a different optical screen pattern than the diaphragm 11, the shadow image of the absorption bodies can also in this case be easily distinguished from the shadow image of the diaphragm. In order to prevent distortion of the visible light beam during passage through the transparent absorption bodies these may preferably be designed in the manner schematically illustrated in FIG. 3, which shows an absorption body in a section substantially parallel to the direction of radiation. The absorption body 7 consisting of a material transparent to the visible light but having a predetermined absorption factor for the ionizing radiation is joined with bodies 12a and 12b of a material having the same refractive index for the visible light as the material of the absorption body 7 but a high transmission factor for the ionizing radiation to an assembly with a substantially constant thickness in the direction of radiation. In this way deflection of the visible light rays during their passage through the absorption body is prevented.

When using absorption bodies of a material which is transparent to the visible light in a device of the type schematically illustrated in FIG. 2 it is possible to facilitate a correct adjustment of the position of the absorption bodies additionally, in that the absorption bodies are provided with opaque lines, which produce corresponding sharp shadow lines on the object 3 and its support surface 10, whereby these shadow lines can be used as a guide when adjusting the position of the absorption bodies. The opaque lines on the transparent absorption bodies may preferably be arranged to interconnect points on the absorption bodies having substantially the same absorption, that is the same thickness in the direction of radiation. The opaque lines will then correspond to isoabsorption lines on the absorption bodies. The mutual distance between the lines is preferably selected to correspond substantially to a predetermined difference in thickness of the object to be radiographed. Consequently, the absorption bodies are adjusted to such position that the shadow lines produced on the object by the opaque lines on the absorption bodies coincide with points on the object having said mutual difference in thickness.

In the embodiment of the invention schematically illustrated in FIG. 4 a source 13 of visible light is located between the object plane 2 containing the object 3 to be radiographed and the absorption body 7, which in the illustrated example consists of a single dished plate, so as to emit a visible light beam 14 towards the lower surface of the absorption body 7. The lower surface of the absorption body is provided with a light reflecting surface 15, which reflects the light beam 14 towards the object plane 2. The position of the light source 13 relative to the reflecting surface 15 on the absorption body 7 is such that the light beam is reflected from the surface 15 towards the object plane 2 in the same direction as if originated from the source 1 of ionizing radiation. Consequently, the light beam 14 reflected from the reflecting surface 15 on the absorption body 7 produces a visible "image" of the absorption body 7 on the object 3 and its support surface 10. This "image" can be used for guidance when adjusting the position of the absorption body 7.

The light source 13 is mounted in a tubular holder 16, which is mechanically coupled to the ionizing radiation source 1 in such a manner (not illustrated in detail in the drawing) that during the adjusting operation the longitudinal axis of the tubular holder coincides with the direction of the central ray in the ionizing radiation beam from the radiation source 1. Further, the light source 13 is provided to emit a second narrow visible light beam 17 through the tubular holder 16 towards the object plane 2. This second light beam 17 will obviously coincide with the direction of the central ray 1 in the ionizing radiation beam from the radiation source 1 and produce a luminous spot upon the object 3 indicating the position of the central ray in the ionizing radiation beam. In this ray the tubular holder 16 with the light source 13 serves also as a ray pointer. The tubular holder 16 with the light source 13 is pivoted in the radiographic apparatus so that it can be moved out of the radiation path before the exposure of the object 3 to the ionizing radiation.

In order to facilitate the adjustment of the absorption body additionally in a device of the type illustrated in FIG. 4 the light reflecting surface 15 on the absorption body 7 may preferably be divided into several discrete areas separated by non-reflecting lines, which produce corresponding dark lines on the object 3 and its support surface 10. These non-reflecting lines are then preferably located on the absorption body 7 so as to indicate predetermined loci on the absorption body, for instance loci connecting points having substantially the same absorption.

FIGS. 5a and 5b show by way of example 'n elevation and section, respectively, an absorption body 7 of this type. The absorption body is elliptically dished and may for instance be used for skull radiography. The reflecting surface 15 is divided into a number of elliptical surface areas 15a, 15b and 15c by non-reflecting, elliptical lines 18a and 18b connecting points on the absorption body 7 having the same thickness in the direction of radiation and thus the same absorption. The distance between the two elliptical rings 18a and 18b may correspond to a predetermined difference in absorption. Further, the reflecting surface areas 15a, 15b, 15c are divided by two mutually orthogonal, non-reflecting lines 19a and 19b, by the aid of which the center of the absorption body can be easily adjusted to a correct position relative to the radiation beam.

FIGS. 6a and 6b show schematically in elevation and end view, respectively, another absorption body of the same general type but being provided with an elongate groove of varying width. An absorption body of this type may preferably be used for radiography of elongated objects of varying breadth, as for instance body extremities. The reflecting surface 15 on the absorption body is in this case divided into surface areas 15a, 15b and 15c by non-reflecting lines 18a and 18b extending along the groove in the absorption body 7 and connecting points on the absorption body having the same thickness and thus the same absorption.

A drawback in the embodiments of the invention schematically illustrated in FIGS. 2 and 4 and described in the foregoing is that the light or shadow image of the absorption bodies produced upon the object or its support surface, respectively, has a comparatively low visual intensity, wherefore it may be difficult to discern with sufficient clarity in daylight. Therefore, the adjustment of the absorption bodies to their correct positions must be carried out in an attenuated ambient light. An appreciable improvement in this respect is obtained with a modification of the invention consisting therein that the absorption bodies are provided with optical means focusing or concentrating predetermined portions of the visible light beam to light intense areas in the object plane substantially corresponding to predetermined loci on the absorption bodies. In this way the shadow or light image of the absorption bodies produced on the object or its support surface, respectively, will contain light intense areas having such a luminous intensity that the adjustment of the absorption bodies to their correct positions can be carried out in daylight.

FIG. 7 illustrates schematically this modification of the invention at a device of the type illustrated in FIG. 2 and described in the foregoing, in which the visbile light beam from the light source 8 is directed towards the side of the absorption bodies 7 facing the ionizing radiation source 1 so as to produce a shadow image of the absorption bodies on the object 3 and its support surface 10, respectively. This light-and-shadow image is made more distinct since positive lenses 21 are mounted along the outer edges of the absorption body to focus the portions of the visible light beam (indicated by dotted lines) passing through the lenses to light intense areas on the object 3 or its support surface 10, respectively. These light intense areas form an easily detectable indication of the outer edges of the absorption bodies 7 and can be used as a guide when adjusting the position of the absorption bodies. As schematically illustrated in FIG. 7, the positive lenses 21 are preferably shaped to produce also a prismatic refraction of the light passing through the lenses with the base of the prism facing the absorption bodies. In this way the light passing through the lenses will be deviated towards the prism base, whereby the light intense areas produced by the lenses will fall upon the object 3 or its support surface 10, respectively, in locations corresponding to the projection of the steepest portions of the absorption bodies and not the projection of the lenses as such, which are located outside the absorption bodies. Consequently, the light intense areas produced by the lenses will correspond to predetermined loci on the absorption bodies and can be used for guidance at the adjustment of the absorption bodies by observation of the position of the light intense areas relative to the object 3. It may for instance be preferable to give the lenses such a prismatic refraction that the light intense areas shall just touch the edges of the object to be radiographed. It is appreciated that the prismatic positive lenses are preferably shaped as elongate cylindric lenses extending along the edges of the absorption bodies, whereby elongate light intense areas on or about the object to be radiographed are produced. It is also appreciated that with a prismatic refraction in the positive lenses 21 a certain parallax error is produced in the sense that the position of the light intense areas upon the object 3 will be dependent on the thickness of the object. However, this parallax error is more to an advantage than a disadvantage, as for a thicker object the light intense areas produced by the lenses will appear upon the upper side of the object 3 closer to the central axis of the ionizing radiation beam than for a thinner object, which induces the X-ray technician to move the absorption bodies 7 further away from the central axis, which is exactly what is required for a thicker object.

FIG. 8 illustrates schematically how a similar result can be achieved in a device according to the invention of the type illustrated in FIG. 4 and described in the foregoing, in which the visible light source 13 is adapted to emit a visible light beam towards the side of the absorption body facing the object plane 2 and the adsorption body is provided with a reflecting surface 15, which reflects the light beam towards the object 3 and its support surface 10. In this case the absorption body 7 is provided with one or several positive lenses 20a and 20b, respectively, mounted in front of the reflecting surface 15 or attached thereto so as to focus the light beam reflected by the surface 15 to produce light intense areas on the object 3 and its support surface 10, respectively. In the illustrated example it is assumed that the lens 20a is a spherical lens, which produces a substantially circular luminous spot on the object 3, whereas the lens 20b is annular and extending along the outer rim of the absorption body 7 so as to produce an elliptical or circular luminous line upon the object 3 or its support surface 10, respectively.

It is appreciated that a similar result can be obtained without the positive lenses 20a and 20b attached to the reflecting surface 15 of the absorption body 7, if instead of these positive lenses the reflecting surface is provided with corresponding concave portions, which focus the reflected light beam to predetermined light intense areas on the object or its support surface, respectively. An absorption body 7 of this type is schematically illustrated in FIG. 9, the reflecting surface 15 on the lower side of the absorption body having a central, spherical concave portion 15a and an annular concave portion 15b surrounding the portion 15a.

In order to obtain a uniform image contrast in all portions of the radiograph, however, the choice of the radiation absorbing substance in the absorption bodies is also important. In the prior art one has generally used absorption bodies of aluminium. This has the disadvantage, however, that those portions of the radiation that pass through thin portions of the objec tbeing radiographed and that consequently pass through thick portions of the absorption bodies will be subject to a displacement of the energy distribution spectrum of the radiation towards higher energy values, that is to a harder radiation. Since this harder radiation has a higher penetration in the object being radiographed, the portions of the object having a low adsorption, that is generally the thinner portions of the object, will be reproduced with a lower image contrast that the portions of the object having a higher absorption, that is normally the thicker portions of the object. This can be avoided, however, if as radiation absorbing substance in the radiation body one selects a substance have a K-absorption edge located within the energy distribution spectrum of the radiation used for the radiographic exposure and preferably close to the energy value for the intensity maximum of the radiation being used. For X-ray radiation this means that the absorption edge of the radiation absorbing substance shall correspond to an energy, which multiplied by a factor of 1.2 to 2.0, preferably about 1.4, gives the voltage used on the X-ray tube during the radiographic exposure. This value is not critical, however, but the tube voltage may vary within a comparatively wide range without the contrast improvement being lost. The radiation absorbing substance is preferably selected among the rare earth metals, which satisfy the above mentioned condition for tube voltages normally used for radiography of skeleton structures and also for many soft tissue structures.

What we claim is:

1. A radiographic apparatus comprising an object plane for an object to be radiographed, a source for a beam of penetrative radiation directed towards said object plane, a penetrative radiation absorbing filter device positioned in the path of said penetrative radiation beam between said source and said object plane, said filter device including at least one solid filter body, said filter body having a varying absorption for penetrative radiation in a plane through the body perpendicular to the direction of said penetrative radiation beam and being movable in at least one direction parallel to said plane, means for generating and projecting a beam of visible light towards said filter body coaxially with said penetrative radiation beam, light converging means mounted on said filter body for focusing at least part of said light beam onto said object plane so as to produce therein at least one extended illuminated area of increased light intensity, said extended illuminated area having an extension in said object plane substantially corresponding to the extension of the locus of intersections between the object plane and rays in said penetrative radiation beam passing through portions of said filter body displaying substantially one and the same predetermined absorption for said penetrative radiation beam.

2. A radiographic apparatus as claimed in claim 1, wherein said light beam is directed towards said filter body in the same direction as said penetrative radiation beam and said light converging means include at least one positive lens attached to an outer edge of said filter body.

3. A radiographic apparatus as claimed in claim 2, wherein said positive lens is elongate and disposed with its longitudinal axis substantially parallel to said outer edge of the filter body.

4. A radiographic apparatus as claimed in claim 2, wherein said positive lens is shaped to cause also a prismatic refraction of the light passing through the lens in direction towards a central axis of said light beam.

5. A radiographic apparatus as claimed in claim 1, wherein said light beam is directed towards said filter body in a direction opposite to the direction of said penetrative radiation beam, and said light converging means include at least one concave, light reflecting mirror surface disposed on said filter body for focusing at least part of said light beam onto said object plane.

6. A radiographic apparatus as claimed in claim 5, wherein said concave mirror surface has an extension substantially corresponding to the extension of a locus on the filter body connecting points with substantially one and the same predetermined absorption for said penetrative radiation beam.

7. A radiographic apparatus as claimed in claim 1, wherein said light beam is directed towards said filter body in a direction opposite to the direction of said penetrative radiation beam, and said light converging means include a light reflecting mirror surface disposed on said filter body for reflecting said light beam towards said object plane and at least one positive lens mounted on said filter body in front of said morror surface for focusing at least part of the reflected light beam onto the object plane.

8. A radiographic apparatus as claimed in claim 7, wherein said positive lens has an extension substantially corresponding to the extension of a locus on the filter body connecting points with substantially one and the same predetermined absorption for said penetrative radiation beam.

9. A radiographic apparatus as claimed in claim 1, wherein said light beam is directed towards sail filter body in a direction opposite to the direction of said penetrative radiation beam and said light converging means include a light reflecting mirror surface disposed on said filter body for reflecting said light beam towards said object plane, said means for generating and projecting said light beam including a lamp and a lamp holder with opposite axial exist openings for light, said lamp holder being disposed between said filter body and said object plane and being mechanically coupled to said source of said penetrative radiation beam so as to have an operative position with its longitudinal axis coinciding with a central axis of said penetrative radiation beam, said lamp being mounted in said lamp holder for emitting said light beam through the axial exit opening facing the filter body and a narrow pencil of light through the axial exit opening facing the object plane.

10. A radiographic apparatus as claimed in claim 1, wherein said filter body consists of a material containing at least one penetrative radiation absorbing element having a K-absorption edge located close to the energy value for the intensity maximum of the penetrative radiation used for the radiographic exposure of the object to be radiographed.

11. A radiographic apparatus as claimed in claim 10, wherein said source for said penetrative radiation beam includes an X-ray tube and the K-absorption edge of said penetrative radiation absorbing element corresponds to an energy, which multiplied by a factor within the range 1.2 to 2.0 corresponds to the voltage used on said X-ray tube for the radiographic exposure of the object to be radiographed.

12. A radiographic apparatus as claimed in claim 10, wherein said penetrative radiation absorbing element is a rare earth metal.

References Cited

UNITED STATES PATENTS

| 3,248,547 | 4/1966  | Van de Geijn      | 250—86    |
| 3,151,244 | 9/1964  | Savouyaud et al.  | 250—105 X |
| 2,405,444 | 8/1946  | Moreau et al.     | 250—86    |
| 2,630,536 | 3/1954  | Vladeff           | 250—86    |
| 2,614,224 | 10/1952 | Wright            | 250—105 X |

FOREIGN PATENTS

| 1,238,323 | 4/1967 | Germany | 250—10 |

WILLIAM F. LINDQUIST, Primary Examiner

U.S. Cl. X.R.

250—105